(12) United States Patent
Geerlings et al.

(10) Patent No.: US 9,500,302 B2
(45) Date of Patent: Nov. 22, 2016

(54) METHOD FOR ATTENUATING NOISE PRODUCED BY PIPES AND PIPE ARRANGEMENT

(75) Inventors: Alexander Cornelis Geerlings, Boxmeer (NL); Jan Sietsma, Helmond (NL)

(73) Assignee: Koninklijke Philips N.V., Eindhoven (NL)

( * ) Notice: Subject to any disclaimer, the term of this patent is extended or adjusted under 35 U.S.C. 154(b) by 117 days.

(21) Appl. No.: 14/236,926

(22) PCT Filed: Aug. 22, 2012

(86) PCT No.: PCT/IB2012/054238
§ 371 (c)(1),
(2), (4) Date: Feb. 4, 2014

(87) PCT Pub. No.: WO2013/027181
PCT Pub. Date: Feb. 28, 2013

(65) Prior Publication Data
US 2014/0202548 A1   Jul. 24, 2014

Related U.S. Application Data

(60) Provisional application No. 61/526,358, filed on Aug. 23, 2011.

(51) Int. Cl.
*F16L 9/19* (2006.01)
*A01K 97/01* (2006.01)
*A01K 97/02* (2006.01)

(52) U.S. Cl.
CPC .............. *F16L 9/19* (2013.01); *A01K 97/01* (2013.01); *A01K 97/02* (2013.01); *Y10T 137/0318* (2015.04)

(58) Field of Classification Search
CPC ................................ F16L 55/0336; F16L 9/18
USPC ............. 137/110, 111, 114; 165/164; 60/645
See application file for complete search history.

(56) References Cited

U.S. PATENT DOCUMENTS 3,433,028 A * 3/1969 Klee ............................... 62/50.7
3,596,734 A * 8/1971 Yates, Jr. ................. F02K 1/827
                                                                  188/33
4,014,369 A   3/1977 Kobres, Jr.
(Continued)

FOREIGN PATENT DOCUMENTS

CN         1926374 A      3/2007
DE         10121366 A1    12/2002
(Continued)

*Primary Examiner* — Kenneth Bomberg
*Assistant Examiner* — Dapinder Singh (57) ABSTRACT

The present invention relates to a method for attenuating noise produced by steam flowing through a pipe, comprising the steps of providing a pipe arrangement (10), which comprises an inner pipe (12) that defines in its inside an inner flow channel (14) which progresses in pipe direction (16) of the inner pipe (12), and an outer pipe (18) that surrounds the inner pipe (12) and progresses substantially parallel thereto, thereby defining an outer flow channel (20) between the two pipes (12, 18) which is substantially parallel to the inner flow channel (14), establishing a steam flow (22) in and along the inner flow channel (14), and establishing a water flow (28) in and along the outer flow channel (20), said water flow (28) being adapted to attenuate a noise produced by said steam flow (22) flowing through the inner flow channel (14).

17 Claims, 3 Drawing Sheets

(56) References Cited

U.S. PATENT DOCUMENTS

| | | |
|---|---|---|
| 4,876,780 A | 10/1989 | Stahl et al. |
| 5,097,898 A * | 3/1992 | Verkaart ................ 165/154 |
| 6,032,468 A | 3/2000 | Fetescu et al. |
| 6,056,019 A | 5/2000 | Dubois |
| 6,253,855 B1 * | 7/2001 | Johal et al. ............. 166/367 |
| 2002/0089177 A1 * | 7/2002 | Bonn .................... 285/123.5 |
| 2008/0134692 A1 | 6/2008 | Crowley |

FOREIGN PATENT DOCUMENTS

| | | |
|---|---|---|
| DE | 102004035955 A1 | 3/2006 |
| GB | 2411711 A | 9/2005 |
| JP | 6283085 A | 4/1987 |
| JP | 1128478 A | 2/1999 |
| JP | 2003-063495 * | 5/2003 |

* cited by examiner

METHOD FOR ATTENUATING NOISE PRODUCED BY PIPES AND PIPE ARRANGEMENT

CROSS-REFERENCE TO PRIOR APPLICATIONS

This application is the U.S. National Phase application under 35 U.S.C. §371 of International Application No. PCT/IB2012/054238, filed on Aug. 22, 2012, which claims the benefit of, U.S. Provisional Patent Application No. 61/526,385, filed on Aug. 23, 2011. These applications are hereby incorporated by reference herein.

FIELD OF THE INVENTION

The present invention relates to a method for attenuating noise produced by pipes transporting a flow of fluids, gases, particles or combinations of any of those. Further, the present invention relates to a pipe arrangement and a system for carrying out said method.

BACKGROUND OF THE INVENTION

Energy plants in areas where water is scarce will be equipped with dry or air cooled heat exchangers. After leaving a generator of the energy plant the steam flows through a pipe towards a heat exchanger unit where the steam is cooled, for instance, by means of air generated by fans. The condensed water is led back to the generator through a return pipe. This especially occurs in arid environments where water is preserved. According to the state of the art two separate support structures are used therefore, one pipe carrying the steam and the return pipe carrying the condensed water back to the generator.

Due to high pressures and a high flowing speed of the steam, the steam produces noise while flowing through the pipe. Thus, the pipe carrying the steam radiates noises which pollute the environment. Especially inside city limits costly acoustic measures have to be taken to prevent a noise pollution caused by the pipe carrying the steam. A proven method of increasing the insulation of the steam pipe is to add mass to the pipe or to equip the steam pipe with a special insulating element, such as an insulating cover. However, such an insulation produces extra material costs which increase the overall costs of such a pipe system considerably.

SUMMARY OF THE INVENTION

It is an object of the present invention to provide an improved method and a pipe arrangement for attenuating noise produced by steam flowing through a pipe, which are, compared to methods and systems known in the art, cheaper considering the material costs and easier to apply.

In a first aspect of the present invention a method is presented, comprising the steps of:

providing a pipe arrangement, which comprises an inner pipe that defines in its inside an inner flow channel which progresses in pipe direction of the inner pipe, and an outer pipe that surrounds the inner pipe and progresses substantially parallel thereto, thereby defining an outer flow channel between the two pipes which is substantially parallel to the inner flow channel, establishing a steam flow in and along the inner flow channel, and establishing a water flow in and along the outer flow channel, said water flow being adapted to attenuate a noise produced by said steam flow flowing through the inner flow channel.

In a further aspect of the present invention, a pipe arrangement is presented for carrying out said method.

In a still further aspect of the present invention, a corresponding system is presented for carrying out said method.

Preferred embodiments of the invention are defined in the dependent claims. It shall be understood that the claimed pipe arrangement and the claimed system have similar and/or identical preferred embodiments as the claimed method and as defined in the dependent claims.

It has been recognized by the inventors that an additional acoustical insulation of the pipe through which the steam is flowing can be prevented by making use of a double-walled pipe and establishing a water flow in and along an outer flow channel of an outer pipe that surrounds the inner pipe carrying the steam flow. Said water flow in the outer flow channel is being adapted to attenuate the noise produced by the steam flow flowing through the inner flow channel of the inner pipe. The already available water in the outer flow channel thereby acts as added mass to the inner pipe improving the insulation that attenuates the radiation of the acoustics produced by the steam in the inner flow channel. In an above explained implementation for energy plants, the outer water layer basically becomes the water reservoir for the turbine. So the generator no longer needs a separate water reservoir. This saves space in the generator facility. In view of the amount of return water compared to the volume of the outer flow channel a one-time fill may be required.

The usage of such a double-walled pipe arrangement is compared to known methods using two separate pipes not only more cost efficient but also takes up less space due to the integrated pipe structure. An additional insulating element, which produces extra material costs and takes up space, is thus no longer necessary.

It has to be noted that the outer pipe can have any volume as long as the water mass flowing through the outer flow channel of the used pipe arrangement is large enough to perform the task of adding acoustical insulation. As long as the pipe arrangement is designed as defined above, both pipes, the inner and the outer pipe, can have any desired shape. Of course, with respect to an ideal steam or water flow a circular profile of the two pipes is preferred. However, also other profiles are conceivable without leaving the scope of the present invention.

The water flow directly absorbs the noises produced by the steam in the inner flow channel preventing a propagation of noise outside the pipe arrangement. Thus, only one space saving pipe arrangement with a single double-walled pipe is needed instead of two separate pipes and their structural supports.

According to a preferred embodiment, the method further comprises the step of streaming gas into the water flow to generate a stream of gas bubbles within said water flow. It has been shown that the acoustical absorption effect can be increased by injecting gas into the water flow. In particular air but also other gases may be used therefore. This advantageous effect relies on the changed incompressibility. Noises are thereby effectively attenuated by the gas bubbles introduced within the water layer. Said gas can be streamed into the water flow either before the water flow is entering the presented pipe arrangement or by injecting gas into the already established water flow within the outer flow channel. For a horizontal pipe arrangement this can be exemplarily done by a pipe or conduit having a small diameter compared to the size of the outer flow channel and being arranged within the outer flow channel, progressing substantially parallel thereto. Preferably, said conduit is arranged at the bottom of the outer pipe. To keep an even release of the bubbles all throughout the pipe system, preferably porous nozzles or small holes are used that are arranged within said conduit. For a vertical pipe, in contrast, a circular ring is preferably used to release the gas bubbles. Said circular ring also having a small diameter compared to the size of the outer flow channel and being arranged within the outer flow channel, preferably concentrically to the inner and the outer tube.

The additional noise absorption effect is in this embodiment also caused by scattering of the noise at the boundary of the gas bubbles between water and gas. The gas within the gas bubbles produces an additional acoustical damping. In result, almost no noise is leaving the pipe arrangement.

According to another embodiment, it is furthermore preferred that the gas is constantly streamed into the water flow to generate a stream of gas bubbles which is equally distributed within said water flow. An equal distribution increases the absorption effect even more, since it decreases the probability that noise is leaving the pipe arrangement without being attenuated by water or gas flowing through the outer flow channel.

According to a further preferred embodiment, the method additionally comprises the step of extracting at least a part of said gas from the outer flow channel to prevent pressure build up or expelling of the water layer. This can, for example, be done by draining conduit within the outer pipe which connects the outer flow channel to the surrounding of the outer pipe. This conduit can, for example, be installed at the top of the outer pipe in order to extract ascending gas bubbles. Such an extraction of gas prevents a pressure build up within the outer flow channel and prevents the inner pipe of being exposed to gas due to the expelling of the water layer by the inserted gas.

According to another embodiment of the present invention, it is furthermore preferred that the inner pipe is arranged coaxially to the outer pipe. Such a coaxial arrangement of the pipes leads to an equally distributed water flow around the inner pipe. This again enables an equally efficient insulation in all spatial directions. In case of cylindrical pipes with circular profiles a concentrical arrangement of the two pipes is especially advantageous in view of the most efficient use of water and an equal amount of water layer all around the inner pipe.

According to a further preferred embodiment, the method comprises the step of establishing a vibration insulated connection between the two pipes using a vibration insulated mount. Such a vibration insulated connection prevents a flanking path for acoustics between the inner and the outer pipe. Thus, the effectiveness of the acoustical absorption by the water flow is not corrupted. Said vibration insulated mount can, for example, be realized by an additional insulating element which surrounds the inner pipe to which the mount is connected, thus preventing a direct connection between the outer and the inner pipe. Note the vibration isolation only has to cover the acoustic relevant frequencies while performing a normal static support of the inner pipe system.

According to a still further preferred embodiment, the volume of the water flow is comparatively large with respect to the volume of the steam flow. Increasing the volume of the water flow concurrently increases the acoustical damping effect. The water flow is preferably very low in order not to introduce additional flow noise due to the water flow.

According to a further aspect of the present invention a pipe arrangement is presented for carrying out the presented method, comprising:

an inner pipe that defines in its inside an inner flow channel which progresses in pipe direction of the inner pipe, and an outer pipe that surrounds the inner pipe and progresses substantially parallel thereto, thereby defining an outer flow channel between the two pipes which is substantially parallel to the inner flow channel, said inner pipe having a steam inlet and a steam outlet for streaming in and out steam to establish a steam flow in and along the inner flow channel from said steam inlet to said steam outlet, said outer pipe having a water inlet and a water outlet for streaming in and out water to establish a water flow in and along the outer flow channel from said water inlet to said water outlet, said water flow being adapted to attenuate a noise produced by said steam flow flowing through the inner flow channel.

The technical principle is the same as described above in accordance with the presented method. By providing a double-walled pipe arrangement with an inner pipe carrying the steam and an outer pipe carrying the return flow of water, which surrounds the inner pipe, the water in the outer flow channel attenuates the radiation of the acoustics of the steam flow and thereby acts as added mass acoustically insulating the inner pipe.

The pipes itself can be of any shape, in particular cylindrical or of the shape of a prism. The steam and water in- and outlets can also be of any shape and can be arranged at any position of the inner or outer pipe, respectively, as long as they are adapted to stream in and out steam or water for establishing a steam flow within the inner flow channel and a water flow within the outer flow channel. Preferably, the steam inlet and the water inlet are arranged at opposite ends of the pipe arrangement to generate a steam flow within the inner flow channel which is oriented in the opposite direction to the return water flow in the outer flow channel. The steam outlet and the water outlet are, therefore, also arranged at opposite ends of the pipe arrangement.

According to a preferred embodiment said outer pipe further comprises a gas inlet for streaming gas, in particular air into the water flow to generate a stream of gas/air bubbles within said water flow. It has been shown that the acoustical absorption effect can be increased by injecting gas into the water flow. This advantageous effect relies on the changed incompressibility. Noises are thereby effectively attenuated by the gas bubbles introduced within the water layer. Said gas can be streamed into the water layer either before the water flow is entering the presented pipe arrangement or by injecting gas into the already established water flow within the outer flow channel. For a horizontal pipe arrangement this can be exemplarily done by a pipe or conduit having a small diameter compared to the size of the outer flow channel and being arranged within the outer flow channel, progressing substantially parallel thereto. Preferably, said conduit is arranged at the bottom of the outer pipe. To keep an even release of the bubbles all throughout the pipe system, preferably porous nozzles or small holes are used that are arranged within said conduit. For a vertical pipe, in contrast, a circular ring is preferably used to release the gas bubbles. Said circular ring also having a small diameter compared to the size of the outer flow channel and being arranged within the outer flow channel, preferably concentrically to the inner and the outer tube.

The additional noise absorption effect is in this embodiment also caused by scattering of the noise at the boundary of the gas bubbles between water and gas. The gas within the gas bubbles produces an additional acoustical damping. In result, almost no noise is leaving the pipe arrangement.

According to another embodiment the outer pipe comprises a conduit for extracting at least a part of said gas from the outer flow channel to prevent pressure build up and deterioration of the insulation properties of the water layer. This conduit can, for example, be installed at the top of the outer pipe in order to extract ascending gas bubbles. Such an extraction of gas prevents a pressure build up within the outer flow channel and, in that way expels the water layer around the inner pipe.

According to a further embodiment the inner pipe is coaxial to the outer pipe. Such a coaxial arrangement of the pipes leads to an equally distributed water flow around the inner pipe. This again enables an equally efficient insulation in all spatial directions. In case of cylindrical pipes with circular profiles a concentrical arrangement of the two pipes is especially advantageous.

According to a further embodiment the presented pipe arrangement further comprises a support structure connecting the inner and the outer pipe with each other via an insulation element for establishing a vibration insulated connection between the two pipes. Such a vibration insulated connection prevents a flanking path for acoustics between the inner and the outer pipe. Preferably the insulation establishes its effect in the noise relevant frequency range, while maintaining the structural support. Thus, the effectiveness of the acoustical insulation property and absorption by the water flow is not corrupted. Said vibration insulated mount can, for example, be realized by an additional resilient insulating element which surrounds the inner pipe to which the mount is connected, thus preventing a direct connection between the outer and the inner pipe.

According to a still further embodiment the diameter of the outer pipe is comparatively large with respect to the diameter of the inner pipe. Thereby, the mass of water flowing through the outer flow channel is large enough to attenuate the radiation of the acoustics produced by the steam flowing through the inner flow channel.

In a still further aspect, the present invention relates to a system for carrying out the method presented above, comprising:

a first device, in particular a generator of an energy plant, which is adapted to receive water and to transform said water into steam, a second device, in particular a heat exchanger, which is adapted to receive steam and to transform said steam into water, and a pipe arrangement, comprising an inner pipe that defines in its inside an inner flow channel which progresses in pipe direction of the inner pipe, and an outer pipe that surrounds the inner pipe and progresses substantially parallel thereto, thereby defining an outer flow channel between the two pipes which is substantially parallel to the inner flow channel, said inner pipe having a steam inlet for streaming in steam from said first device and a steam outlet for streaming out steam to said second device to establish a steam flow in and along the inner flow channel from said first device to said second device, said outer pipe having a water inlet for streaming in water from said second device and a water outlet for streaming out water to said first device to establish a water flow in and along the outer flow channel from said second device to said first device, said water flow being adapted to attenuate a noise produced by said steam flow flowing through the inner flow channel.

Such a system is, for example, applied in an energy or power plant. In such an application said first device is, for example, a generator in which water is received and, due to heat, transformed into steam. The generated steam is led through the inner pipe of said double pipe arrangement, flowing in and along the inner flow channel towards the second device, which in such an application is, for example, a heat exchanger. In the heat exchanger the steam is cooled by means of gas generated by fans or by another water cooling channel in order to transform the generated steam again to water. The condensed water is then led back again to the generator through the outer flow channel of said double pipe arrangement. In this way an effective cooling circuit is established wherein the steam flow and the return flow of water are led through the same double-walled pipe arrangement. In contrast to similar systems known in the art, two separate pipes for carrying the steam and the water are no longer necessary and are now integrated into one. Since the water flow is adapted to attenuate the noise produced by the steam flow flowing through the inner flow channel, an additional insulation of the inner pipe is prevented. Thus, the system does not only save material costs, but also space for an extra pipe, which is according to the present invention now integrated into the second pipe carrying the water flow. The degree of noise attenuation by the water flow has proven to be considerably high compared to a mechanical insulation of the steam pipe.

The above-stated problem is, therefore, solved in an efficient way by the method, the pipe arrangement and the system proposed herein.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
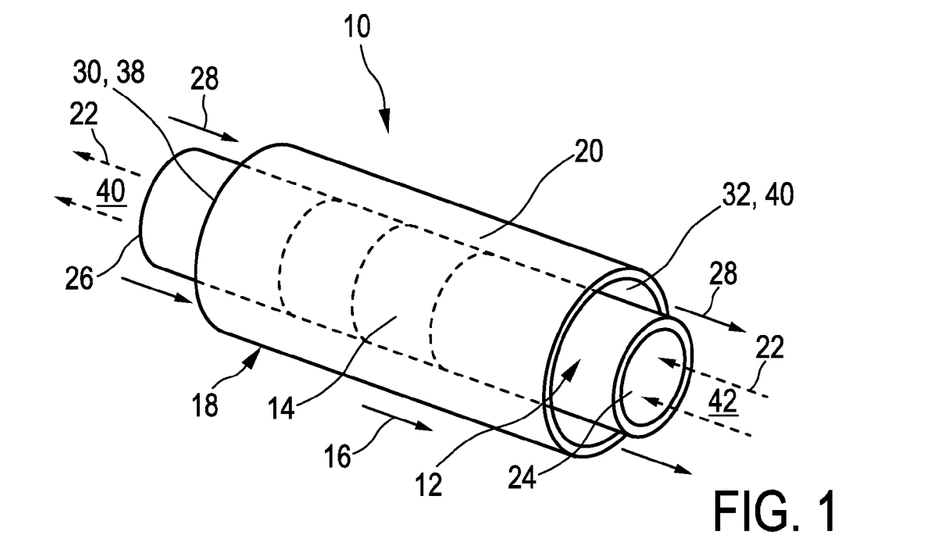
FIG. 1 shows the general principle of the present invention by means of a first embodiment of a pipe arrangement according to the present invention.

FIG. 1 shows a first embodiment of a pipe arrangement 10 comprising an inner pipe 12 that defines in its inside an inner flow channel 14, which progresses in longitudinal direction 16 of the pipe arrangement 10. The inner pipe 12 is surrounded by an outer pipe 18 that is arranged in parallel to the inner pipe 12. Substantially parallel to the inner flow channel 14 an outer flow channel 20 is defined by the two pipes 12, 18, which also progresses in pipe direction 16.

In this way a double-walled pipe arrangement 10 is presented, with an inner flow channel 14 and an outer flow channel 20. According to the method of the present invention, a steam flow is established in and along the inner flow channel 14. This steam flow is indicated by arrows 22.

The steam flow 22 inserts the inner flow channel 14 at a steam inlet 24 and leaves the inner flow channel at a steam outlet 26. The steam inlet 24 and the steam outlet are preferably arranged at the two opposite ends of the inner pipe 12. However, the steam in-/outlet 24, 26 can also be arranged at any other position of the inner pipe 12. The created steam flow 22 flows from the inlet 24 through the inner flow channel 14 or a part of the inner flow channel 14 to the steam outlet 26. The steam in-/outlet 24, 26 are preferably realized by in-/outlet nozzles that, for simplicity reasons, are not shown in FIG. 1.

Further, according to the method of the present invention a water flow is generated within the outer flow channel 20, which is indicated by arrows 28. The water flow 28 inserts the outer flow channel 20 at a water inlet 30, flows between the two pipes 12, 18 through the outer flow channel 20 and leaves the same at a water outlet 32.

Preferably, the steam flow 22 within the inner pipe 12 and the water flow 28 within the outer flow channel 20 are oriented in opposite directions. Instead of the need of an extra acoustical insulation, the noise, which is produced by the steam 22 flowing through the inner pipe 12, is attenuated by the water flow 28 flowing through the outer flow channel 20. The water thereby acts as added mass improving the acoustical insulation of the inner pipe 12 attenuating the radiation of the acoustics produced by the steam flow 22. In order to efficiently attenuate the noise produced by the steam flow 22, the volume of the water flow 28 needs to be considerably large compared to the volume of the steam flow 22.

If the inner pipe 12 is arranged coaxially to the outer pipe 18, a noise attenuation can be realized effectively in all directions of the pipe arrangement 10. However, a coaxial arrangement of the two pipes 12, 18 is not necessary. For example in cases where the noise produced by the steam flow 22 shall be attenuated only at one side of the pipe arrangement 10, the inner pipe 12 may also be laterally shifted within the outer pipe 18.

Figure 2:
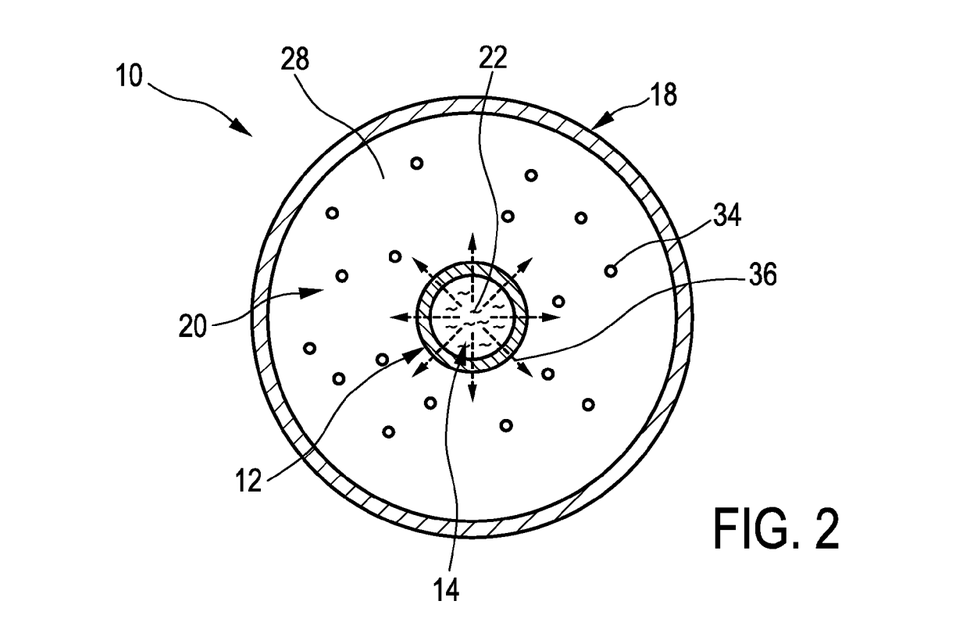
FIG. 2 shows the first embodiment of the pipe arrangement according to the present invention in a cross sectional view.

FIG. 2 shows a cross sectional view of the first embodiment of the pipe arrangement 10. Additionally, gas bubbles 34 are shown that are, according to an embodiment of the presented method, introduced into the water flow 28 within the outer flow channel 20. These gas bubbles 34 are preferably generated by constantly streaming gas into the water flow 28 in order to receive an equally distributed stream of gas bubbles 34 within said water flow 28. The gas bubbles 34 add attenuation and improve the acoustical insulation for noises produced by the steam flow 22 in the inner flow channel 14. Said unwanted noise, which is produced within the inner tube 12, is indicated in FIG. 2 by arrows 36. The above-mentioned gas stream is, according to the method of the present invention, either already integrated into the water stream 28 before entering the pipe arrangement 10 or it is separately injected into the water flow 28 through a gas inlet 38 and extracted from the water flow through a gas outlet 40. The gas in-/outlet 38, 40 can exemplarily be realized by gas nozzles (not shown, for simplicity reasons) arranged at both lateral ends of the pipe arrangement 10. More preferably, the gas is injected into the water layer from a pipe or conduit 49 having a small diameter compared to the size of the outer flow channel 20 and being arranged within the outer flow channel 20, progressing substantially parallel thereto. Such a conduit 49 is exemplarily shown in FIG. 5. Preferably, said conduit 49 is arranged at the lower end of the outer pipe 18. To keep an even release of the gas bubbles all throughout the pipe system, preferably porous nozzles or small holes (for simplicity reasons not shown here) are used that are arranged within and along said conduit 49.

In order to prevent an acoustical flanking path, the two pipes 12, 18 are preferably mounted together at their lateral ends 40, 42 by a vibration insulated connection. For stability reasons, in case of a longer pipe arrangement, an additional support structure is needed to keep the two pipes 12, 18 in a predefined distance from each other. Such a support structure 44 is exemplarily shown in FIGS. 3 and 4 that show a second embodiment of the pipe arrangement 10 in a cross section and in a longitudinal section.

Figure 3:
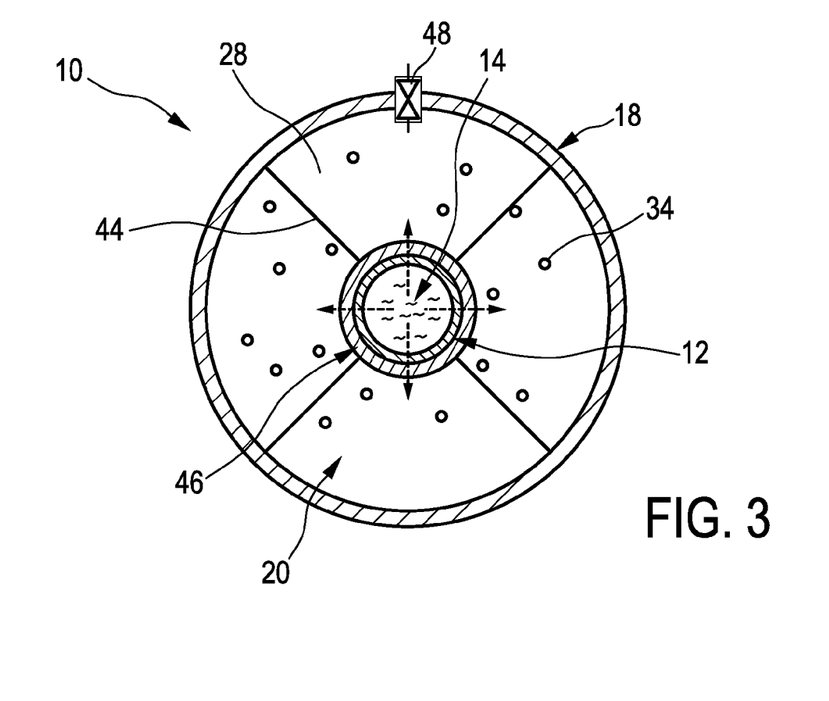
FIG. 3 shows a second embodiment of the pipe arrangement according to the present invention in a cross sectional view.
Figure 4:
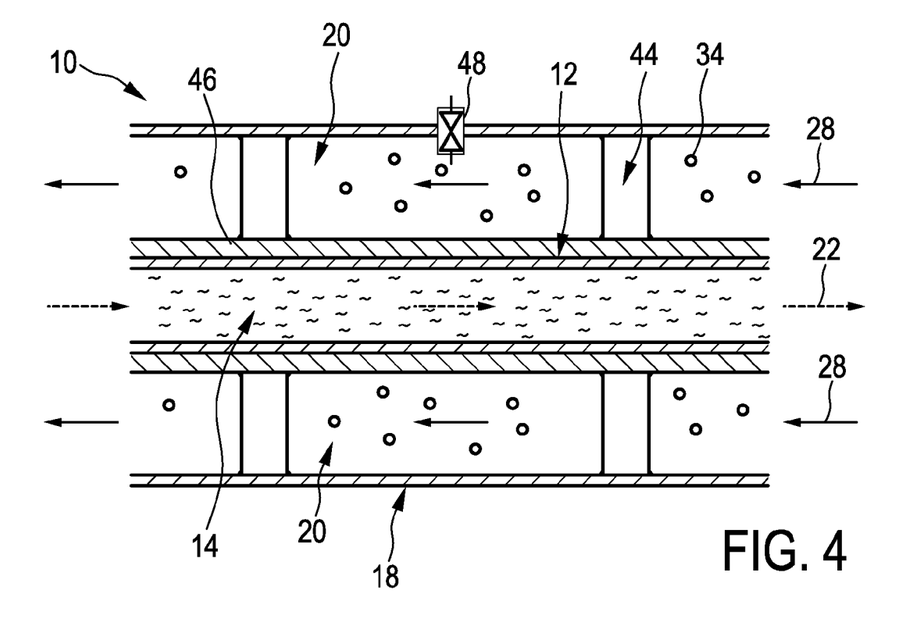
FIG. 4 shows a longitudinal section of the second embodiment shown in FIG. 3.

The support structure 44 can be realized as mechanical support bars which connect the outer superficies surface of the inner pipe 12 with the inner superficies surface of the outer pipe 18. An additional insulation element 46 can be provided which surrounds the inner pipe 12. The support bars 44 are in this case arranged between the outer pipe 18 and said insulation element 46. In this way, a direct connection between the outer pipe 18 and the inner pipe 12 can be prevented, so that no acoustical flanking path occurs between the two pipes 12, 18.

According to the second embodiment shown in FIG. 3, the outer pipe 18 additionally comprises a pressure relief valve 48 which connects the inner flow channel 20 with the surrounding of the pipe arrangement 10. Through this valve 48 at least a part of the gas 34 can be extracted from the outer flow channel 20 in order to prevent a pressure build up.

Figure 5:
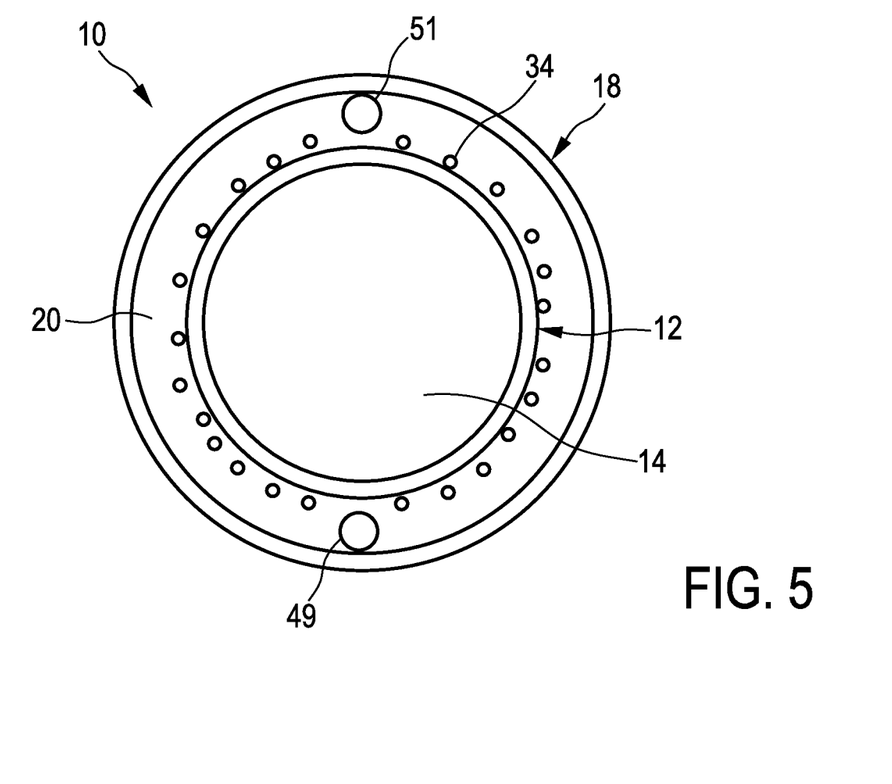
FIG. 5 shows a third embodiment of the pipe arrangement according to the present invention in a cross sectional view.

According to the third embodiment shown in FIG. 5, an extraction conduit 51 is provided for extracting at least a part of said gas 34 from the outer flow channel 20 to prevent pressure build up and deterioration of the insulation properties of the water layer. This conduit 51 can, for example, be installed at the top of the outer pipe 18 and extends along the longitudinal direction of the outer pipe 18 in order to extract ascending gas bubbles 34. Such an extraction of gas prevents a pressure build up within the outer flow channel and, in that way expels the water layer around the inner pipe 12, as schematically shown in FIG. 5.

Figure 6:
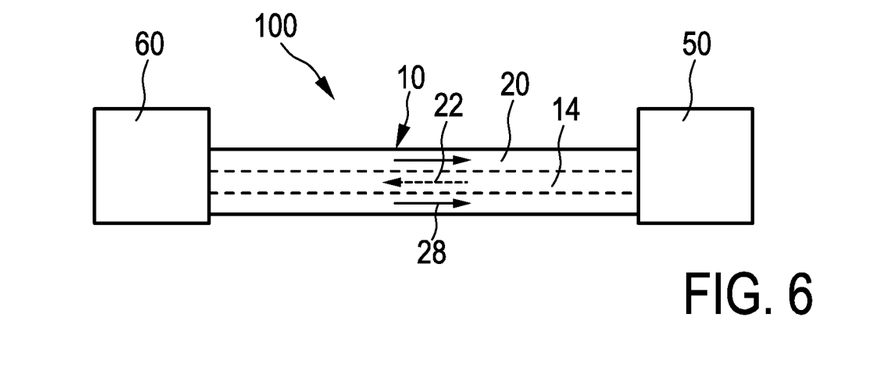
FIG. 6 shows a system for carrying out the method according to the present invention in a schematic view.

FIG. 6 shows a schematic view of a system for carrying out the method according to the present invention. The system 100 comprises a first device 50 and a second device 60 which are connected to each other via the presented pipe arrangement 10. Such a system 100 is, for example, applied in a power plant, more precisely in a cooling circuit of a power plant. The first device 50 can, for example, be a generator of a power plant that produces heat and needs to be cooled by water.

Thus, the water flow 28 is used to cool the generator 50. During cooling the inserted water flow 28 evaporates and the transformed steam 22 leaves the generator 50 again. The generated steam 22 flows back through the inner flow channel 14 of the presented pipe arrangement 10 and enters at the other end of the pipe arrangement 10 the second device 60, which is in such an application usually represented by a heat exchanger. Such a heat exchanger 60 receives the steam 22, cools it by a gas flow or another liquid and condenses it to water 28. The condensed water 28 is then led back to the generator 50 through the outer flow channel 20 of the pipe arrangement 10.

Compared to other systems in the state of the art the double-walled pipe arrangement 10 is used to connect the two devices 50, 60 instead of using two separate pipes, one for the water and one for the steam flow. The water flow 28 that surrounds the inner pipe 12 carrying the steam 22 in this way attenuates the noise produced by the steam 22 and acts as an acoustical insulation. As mentioned above an additional stream of gas bubbles 34 can be generated within the water flow 28 to increase the acoustical absorption effect of the water flow 28. Since no separate pipes are necessary any longer, insulation space can be saved. An extra acoustical insulation of the pipe carrying the steam is also not necessary anymore, so that also material costs can be saved.

In summary, a method, a pipe arrangement and a system are presented which enable for attenuating noise produced by steam flowing through a pipe. The produced noise is mainly attenuated by a water flow which flows through an outer flow channel of a double-walled pipe, which carries in its inner flow channel the steam flow. It has to be noted, that especially the dimensions and the form of the pipe arrangement can vary without leaving the scope of invention.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A method for attenuating noise produced by pipes transporting a flow of fluids, gases, particles or combinations thereof, the method comprising:
    providing a pipe arrangement comprising an inner pipe and an outer pipe,
    the inner pipe defining an internal inner flow channel which progresses in a direction coincident with the longitudinal axis of the inner pipe,
    the outer pipe surrounding the inner pipe which progresses in a direction substantially parallel to a longitudinal axis of the inner pipe, thereby defining an outer flow channel between the two pipes,
    wherein the outer flow channel is substantially parallel to the inner flow channel,
    establishing a steam flow in and along the inner flow channel,
    establishing a water flow in and along the outer flow channel, the water flow being adapted to attenuate a noise produced by the steam flow flowing through the inner flow channel, wherein the water flow in and along the outer flow channel is in a direction opposite to the water flow in the inner flow channel, and
    streaming gas into the water flow to generate a stream of gas bubbles within the water flow.

2. A method as claimed in claim 1, wherein the gas is constantly streamed into the water flow in and along the outer flow channel to generate a stream of gas bubbles which is equally distributed within the water flow.

3. A method as claimed in claim 1, further comprising extracting at least a part of the gas from the outer flow channel to prevent pressure at least one of: build up of the water layer, expelling of the water layer, and any combination thereof.

4. A method as claimed in claim 1, further comprising arranging the inner pipe coaxially to the outer pipe.

5. A method as claimed in claim 1, further comprising establishing a vibration insulated connection between the two pipes using a vibration insulated mount.

6. A method as claimed in claim 1, wherein the volume of the water flow in the outer pipe is comparatively large with respect to the volume of the steam flow in the inner pipe.

7. A pipe arrangement, comprising:
    an inner pipe that defines in its inside an inner flow channel which progresses in a pipe direction of the inner pipe, and
    an outer pipe that surrounds the inner pipe and progresses substantially parallel thereto, thereby defining an outer flow channel between the inner pipe and outer pipe, the outer flow channel being substantially parallel to the inner flow channel,
    the inner pipe having a steam inlet and a steam outlet for streaming in and out steam to establish a steam flow in and along the inner flow channel from the steam inlet to the steam outlet, the outer pipe,
    the outer pipe having a water inlet and a water outlet for streaming in and out water to establish a water flow in and along the outer flow channel from the water inlet to the water outlet, wherein the water flow in and along the outer flow channel is in a direction opposite to the water flow in the inner flow channel,
    wherein the water flow is adapted to attenuate a noise produced by the steam flow flowing through the inner flow channel,
    the outer pipe further having a gas inlet for streaming gas into the water flow to generate a stream of gas bubbles within the water flow.

8. A pipe arrangement as claimed in claim 7, wherein the outer pipe comprises an extraction conduit for extracting at least a part of the gas from the outer flow channel to prevent pressure build up and deterioration of the insulation properties of the water layer.

9. A pipe arrangement as claimed in claim 7, wherein the inner pipe is coaxial to the outer pipe.

10. A pipe arrangement as claimed in claim 7, further comprising a support structure connecting the inner and the outer pipe to each other via an insulation element for establishing a vibration insulated connection between the two pipes.

11. A pipe arrangement as claimed in claim 7, wherein the diameter of the outer pipe is comparatively large with respect to the diameter of the inner pipe.

12. A system for attenuating noise produced by pipes transporting a flow of fluids, gases, particles or combinations of any of those, comprising:
    a generator of an energy plant, adapted to receive water and to transform the water into steam,
    a heat exchanger, adapted to receive steam output from the generator and to transform the steam into water, and
    a pipe arrangement comprising:
    an inner pipe comprising an inner flow channel which progresses in a linear direction coincident with a longitudional axis of the inner pipe, and
    an outer pipe surrounding the inner pipe and progressing in a direction substantially parallel to the inner pipe, thereby defining an outer flow channel between the inner and outer pipe, the outer flow channel being substantially parallel to the inner flow channel,
    the inner pipe further comprising a steam inlet for streaming in steam from the generator and a steam outlet for streaming out steam to the heat exchanger to establish a steam flow in and along the inner flow channel in a direction from the generator towards the heat exchanger, the outer pipe further comprising a water inlet for streaming in water from the heat exchanger and a water outlet for streaming out water to the generator to establish a water flow in and along the outer flow channel in a direction from the heat exchanger to the generator, wherein the water flow in and along the outer flow channel is in a direction opposite to the water flow in the inner flow channel, the water flow being adapted to attenuate a noise produced by the steam flow flowing through the inner flow channel.

13. The system as claimed in claim 12, wherein the gas is constantly streamed into the water flow in and along the outer flow channel to generate a stream of gas bubbles which is equally distributed within the water flow.

14. The system as claimed in claim 12, further comprising a conduit arranged to extract at least a part of the gas from the outer flow channel to prevent pressure at least one of: build-up of the water layer, expelling of the water layer and any combination thereof.

15. The system as claimed in claim 12, further comprising arranging the inner pipe coaxially to the outer pipe.

16. The system as claimed in claim 12, further comprising a vibration insulated connection arranged between the inner and outer pipes using a vibration insulated mount.

17. The system as claimed in claim 12, where in the volume of the water flow in the outer pipe is comparatively large with respect to the volume of the steam flow in the inner pipe.

* * * * *